United States Patent [19]

Lenntoft

[11] 4,000,809
[45] Jan. 4, 1977

[54] TUBULAR BELT CONVEYOR

[75] Inventor: Bo Nils Konrad Lenntoft, Loddekopinge, Sweden

[73] Assignee: Sintab Swedinventor AB, Malmo, Sweden

[22] Filed: Dec. 10, 1974

[21] Appl. No.: 531,672

[30] Foreign Application Priority Data

Dec. 11, 1973 Sweden .............................. 7316679

[52] U.S. Cl. ................................................ 198/819
[51] Int. Cl.² ........................................ B65G 15/08
[58] Field of Search .......... 198/184, 185, 187, 191, 198/192 R, 819

[56] References Cited

UNITED STATES PATENTS

| 2,928,525 | 3/1960 | Schaeffer ........................ 198/184 X |
| 3,421,613 | 1/1969 | Sadek ............................. 198/191 X |

FOREIGN PATENTS OR APPLICATIONS

| 444,549 | 3/1936 | United Kingdom ............... 198/184 |

Primary Examiner—Robert B. Reeves
Assistant Examiner—John P. Shannon
Attorney, Agent, or Firm—Blair & Brown

[57] ABSTRACT

A conveyor having a tubular endless belt with lateral beads to be engaged by drive and idler pulleys and with clip springs to load the longitudinal edges of the belt into abutting relationship. In order to supply and discharge material respectively to and from the hollow space of the conveyor at desired locations along the conveyor path stationary pressure rollers separate the longitudinal edges of the belt against the bias of the clip springs. Alternatively, power can be used to separate the longitudinal edges of the belt, the power having pulleys engageable with the beads of the belt. To facilitate the discharge of material from the conveyor guide rollers provide a convex bight in the belt along the inner run thereof immediately ahead of the discharge location.

8 Claims, 12 Drawing Figures

TUBULAR BELT CONVEYOR

This invention relates to a tubular belt conveyor comprising an endless conveyor belt which is formed to a tubular profile and the longitudinal edge portions of which converge substantially rectilinearly to one another on the inner run of the endless loop formed by the conveyor belt and are applicable against one another at the longitudinal conveyor belt edges.

Such a closed conveyor is well suited for conveyance of for instance granulate or pulverulent materials. However, it is most important that the conveyor can be used for both vertical and horizontal conveyance of the materials and that it can be driven at a relatively high speed without throwing the material out of the tubular profile, so that small amounts of materials can be carried in the conveyor for a given conveying capacity. It is also desirable to have the possibility of introducing material into the conveyor and removing material therefrom at any desired point of the endless loop formed by the conveyor.

To this end, the invention provides a tubular belt conveyor of the type outlined above, in which the conveyor belt is provided with spring clip means adapted to elastically yieldingly load the longitudinal conveyor belt edges into abutting relationship and in which beads having the shape of V-belts are disposed on the sides of the tubular profile to establish engagement of the conveyor belt with pulleys.

Embodiments of the invention will be more fully described hereinbelow and with reference to the accompanying drawings in which.

Figure 1:
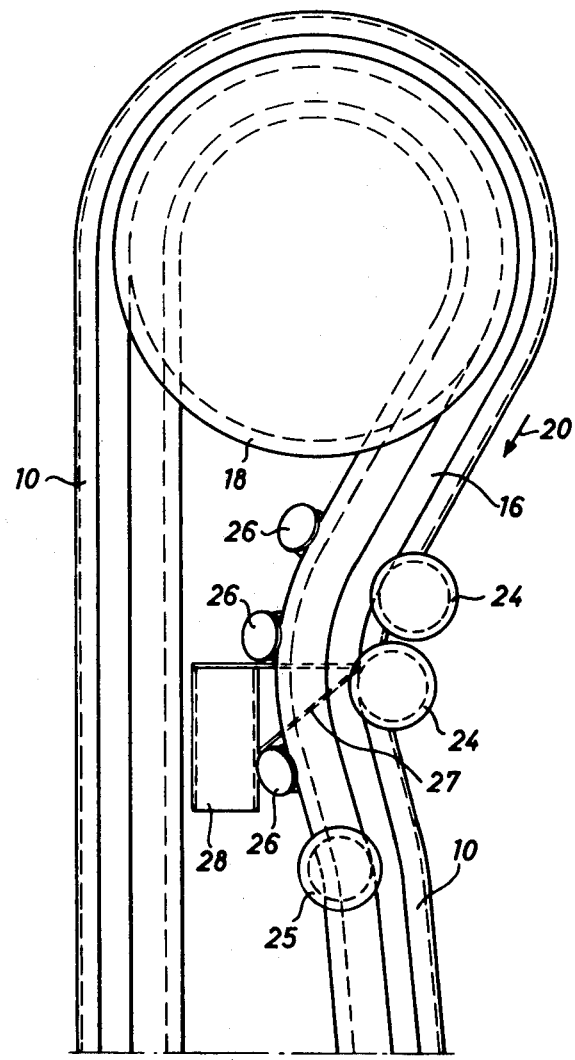
FIG. 1 is vertical projection of the upper portion of a tubular belt conveyor according to the invention.

The tubular belt conveyor illustrated in the drawings comprises an endless conveyor belt 10 of relatively soft rubber with reinforcing fabric inserts. The belt is formed to a tubular profile with a substantially semi-circular portion 11 formed by the middle portion of the conveyor belt, while the edge portions 12 of the conveyor belt are straight and converge towards one another. These straight portions of the conveyor belt are yieldingly urged into abutting relationship at the longitudinal edges of the conveyor belt by a number of steel spring clips 13 which are embedded in the conveyor belt and which with a relatively large force press the longitudinal edges of the conveyor belt into abutting relationship at sealing surfaces 14, simultaneously as they allow the tubular profile, formed by the conveyor belt, to flex sufficiently in the longitudinal direction thereof. Instead of a number of separate steel spring clips 13, a continuous steel wire bent in zig-zag fashion may be embedded in the conveyor belt, said steel wire constituting a coherent row of steel spring clips. Embedded in the conveyor belt between the steel spring clips are also a number of steel wire yokes 15 which extend along the substantially semi-circular portion and protrude with their ends into beads 16 having the shape of V-belts and being integral with the tubular profile on the sides thereof. The said beads are formed with a double-sided V-belt profile and have cord inserts so oriented that the beads are longitudinally flexible in both directions about axes 17. The conveyor belt formed to a tubular profile is placed with the beads 16 as an endless loop about upper and lower pairs of return wheels 18 and 19, respectively, so that the longitudinal edges of the conveyor belt which are in abutting relationship by the action of the U-shaped steel spring clips extend along the inner run of the endless loop formed by the conveyor belt. One of the return wheel pairs is driven and in its turn drives the endless loop at the beads 16, the traction therein being taken up by the cord inserts.

Figure 2:
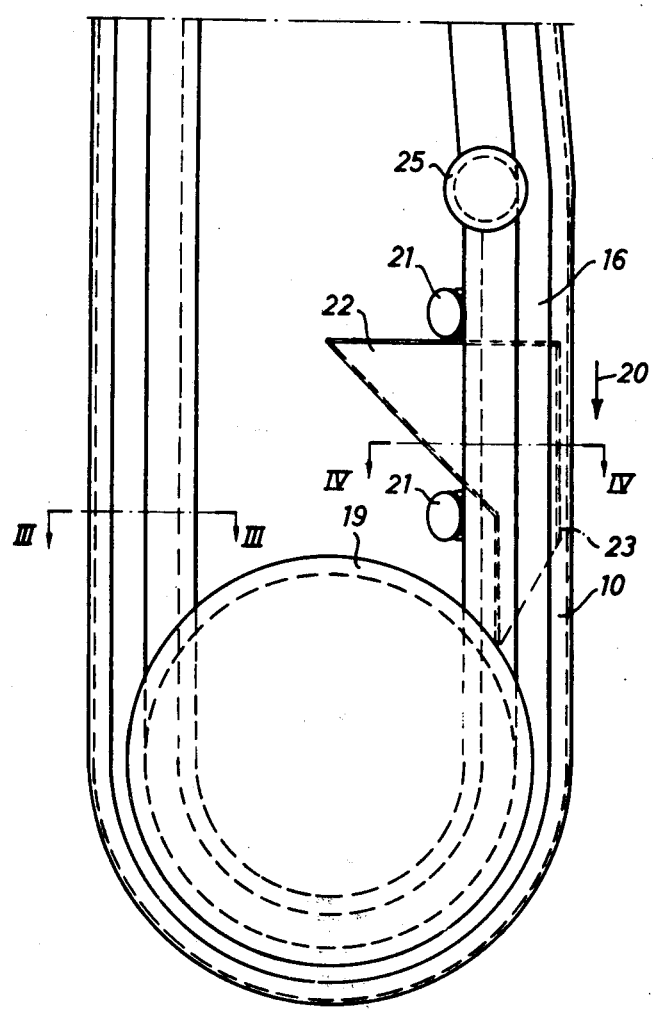
FIG. 2 is a corresponding projection of the lower portion of the conveyor.
Figure 4:
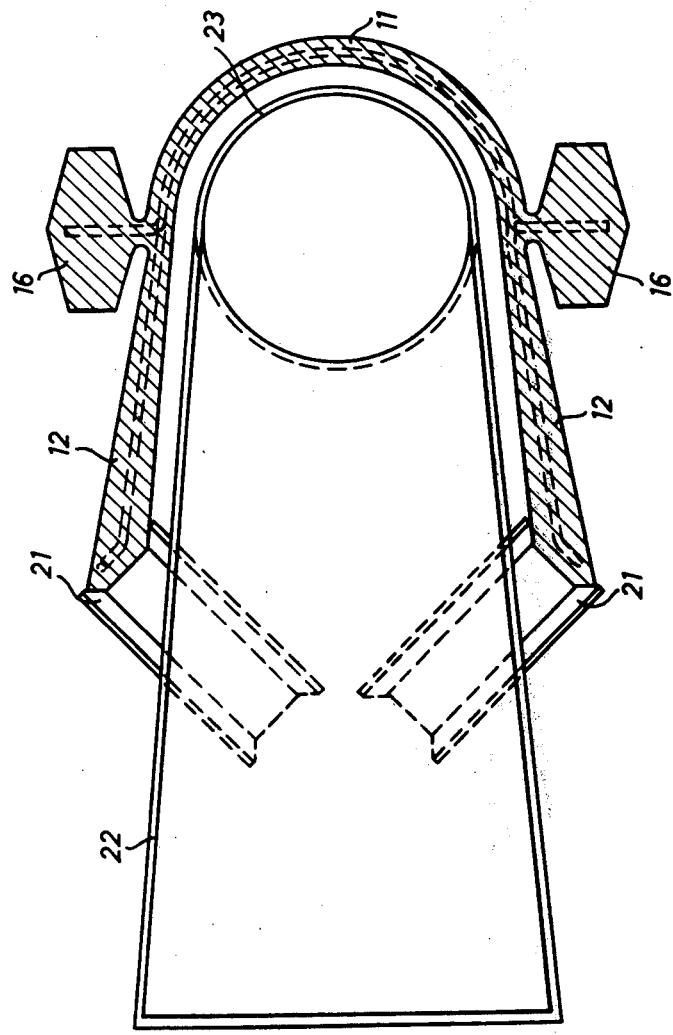
FIG. 4 is a corresponding cross section on the line IV—IV in FIG. 2.
Figure 5:
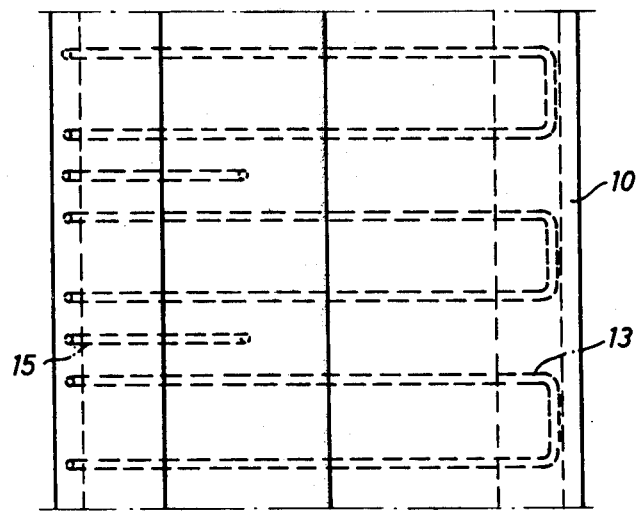
FIG. 5 is a side elevation, on a larger scale, of part of the conveyor belt formed into a tubular profile, with a wire reinforcement arranged therein.

For supplying granulate or pulverulent material to the hollow space formed by the tubular belt conveyor, and for discharging it therefrom, said space must be opened at the abutting longitudinal conveyor belt edges, and opening up of said space must be carried out against the resistance of the steel spring clips. One way of opening up the hollow space is shown in FIGS. 2 and 4. Assuming that the conveyor runs in the direction marked by the arrow 20, two pairs of grooved rollers 21, FIG. 2, are provided for supplying material to the hollow space of the conveyor, said grooved rollers engaging the longitudinal edges of the conveyor belt and being spaced apart transversely of the conveyor to keep the said edges apart against the resistance of the steel spring clips. The edges are thus moved apart when the conveyor belt approaches the uppermost pair of rollers, and are then kept apart over a short distance by the said pair of rollers as well as the lowermost pair of rollers, thereafter to close again downstreams of the latter roller pair by the spring action of the steel spring clips. In this manner an aperture slot is formed in the hollow profile, as is shown in FIG. 4, over that distance of the path of travel of the conveyor which lies between the pairs of rollers 21. A stationary filling hopper 22 penetrates into the interior of the tubular profile through said aperture slot and connects onto a socket 23 which extends some distance in the direction of travel of the conveyor inside the tubular profile in order that the supplied material shall leave the socket only after the tubular profile has closed again.

The supplied material is compacted in the hollow space of the tubular profile and is carried along in the movement of the conveyor by the friction against the walls of the tubular profile. The material can be carried by the conveyor to practically any height whatever.

Emptying of the conveyor can take place along a straight length of the path of travel of the conveyor, which is also true of the supply of the material. However, it is still more suitable to conduct the conveyor for the emptying thereof in a bight which is convex along the inner run of the conveyor, thereby to impart such a direction of motion to the material that it is thrown out of the hollow space of the conveyor through the aperture slot. As shown in FIG. 1, a number of outer and inner guide pulleys 24 and 25, respectively, are provided for this purpose. Said guide pulleys engage the beads 16 and thus conduct the conveyor so that the contemplated bight is formed. On the convex side of the bight three pairs of grooved rollers 26 engage the longitudinal edges of the conveyor belt in the same way as was earlier described for the grooved rollers 21, to provide an aperture slot in the hollow profile. A hopper 27 or deflector penetrates through said aperture slot into the hollow space of the conveyor to deflect material from the interior of the conveyor. From this hopper the material can fall freely down into a collecting container or bin and the flow of material may be controlled by means of an outlet socket 28 connected to the hopper. Guide pulleys 24 and 25 are provided to the extent necessary to return the conveyor to its straight path of travel.

Figure 3:
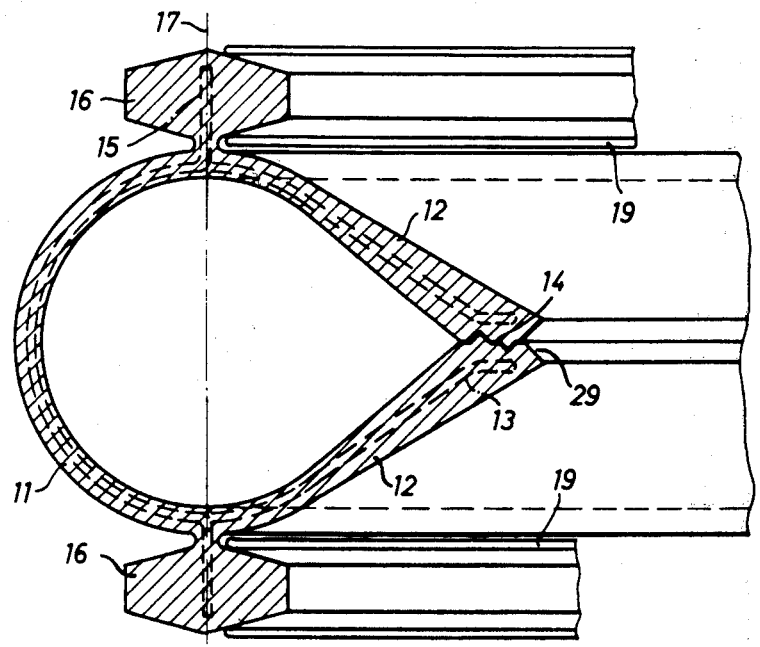
FIG. 3 is a cross section, on a larger scale, on the line III—III in FIG. 2.

To facilitate engagement of the rollers 21 and 26, respectively, with the longitudinal edges of the conveyor belt said edges are configured so as to form a V-shaped external groove 29, FIG. 3, when the tubular profile is closed. Moreover, to prevent a relative displacement of the abutting sealing surfaces 14 and to safeguard a reliable seal between them, said surfaces may be formed with interengaging ribs and grooves, also shown in FIG. 3.

Figure 6:
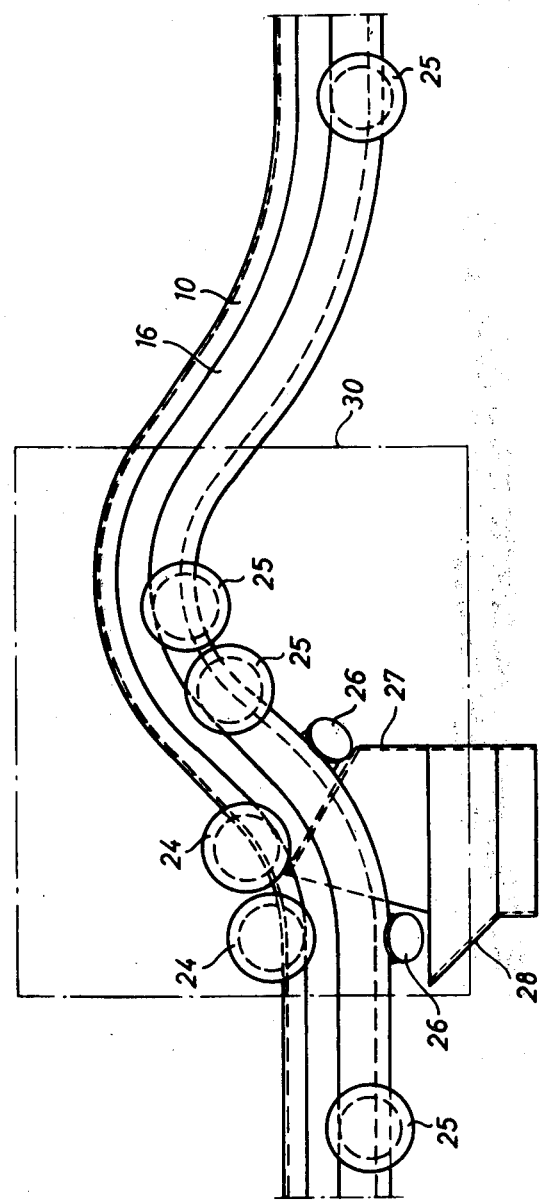
FIG. 6 is a vertical projection, similar to FIGS. 1 and 2, of part of a tubular belt conveyor for horizontal conveyance.

The supply of material to and the discharge of material from the conveyor can take place in a vertical section as well as a horizontal section of the path of travel of the conveyor. Such a section is always easily realized by the intermediary of guide pulleys which engage the beads 16. At higher conveying rates, however, vertical filling is to be preferred since the initial speed of the material is easily regulated. The conveyor may suitably be utilized for supplying material to and emptying it from a number of different containers or bins, the filling and emptying hopper, respectively, being designed to permit adjustment along a horizontal section of the conveyor, see FIG. 6. In this instance, the guide pulleys 24 and 25 are mounted for rotation on a carriage or sled which is indicated by dash-and-dot lines 30 and is carried and guided in a suitable manner for movement along the horizontal part of the conveyor. By displacing the carriage or sled, a more or less pronounced bight can be provided in the path of travel of the conveyor. The grooved rollers 26 are also mounted for rotation on the carriage or sled to provide the aperture slot in the bight, and the hopper or deflector 27 which penetrates through the aperture slot into the hollow space of the conveyor is also mounted on the carriage or the sled, as is the connecting socket 28, if any.

Figure 7:
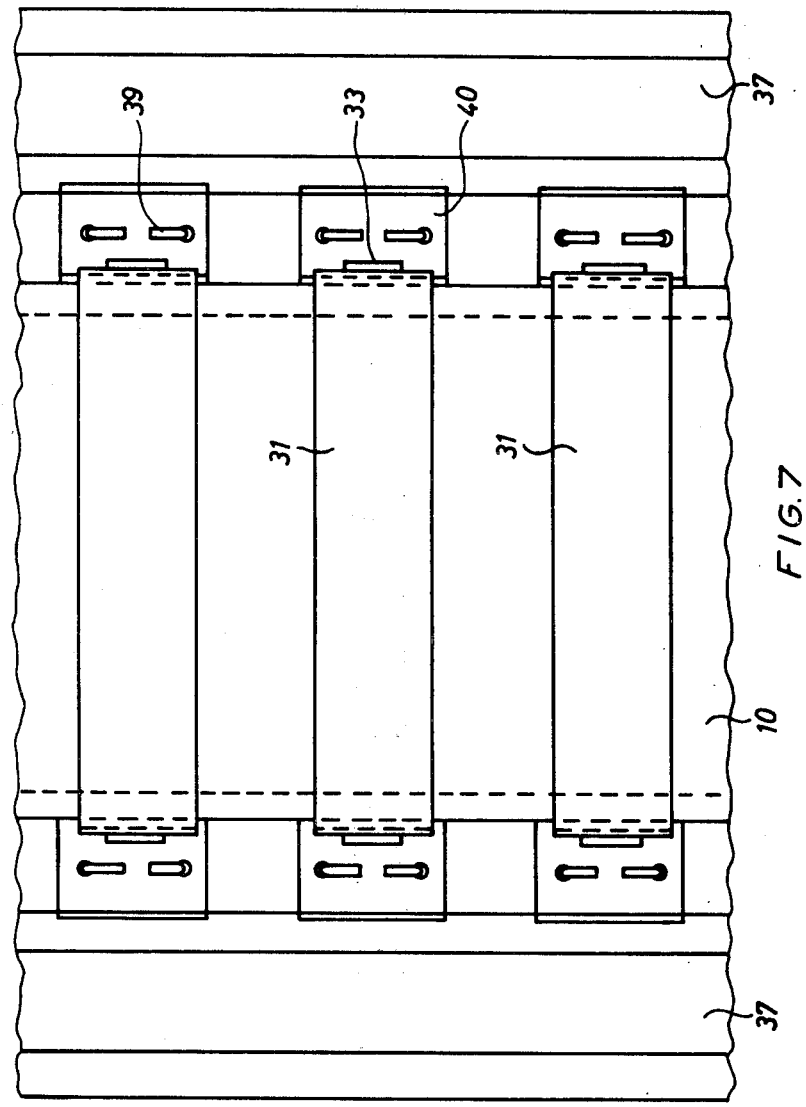
FIG. 7 is a plan view of part of a tubular belt conveyor according to the invention in a modified embodiment thereof.
Figure 8:
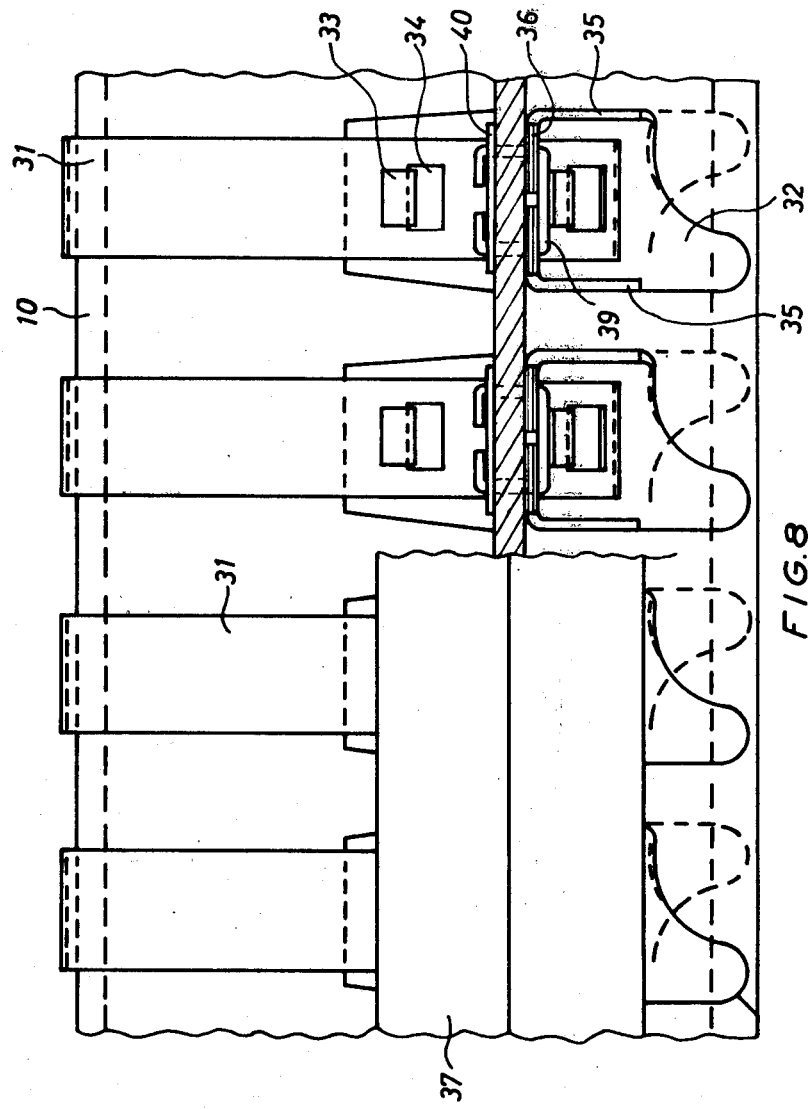
FIG. 8 is a side elevation, partly in longitudinal section, of the tubular belt conveyor in FIG. 7.
Figure 9:
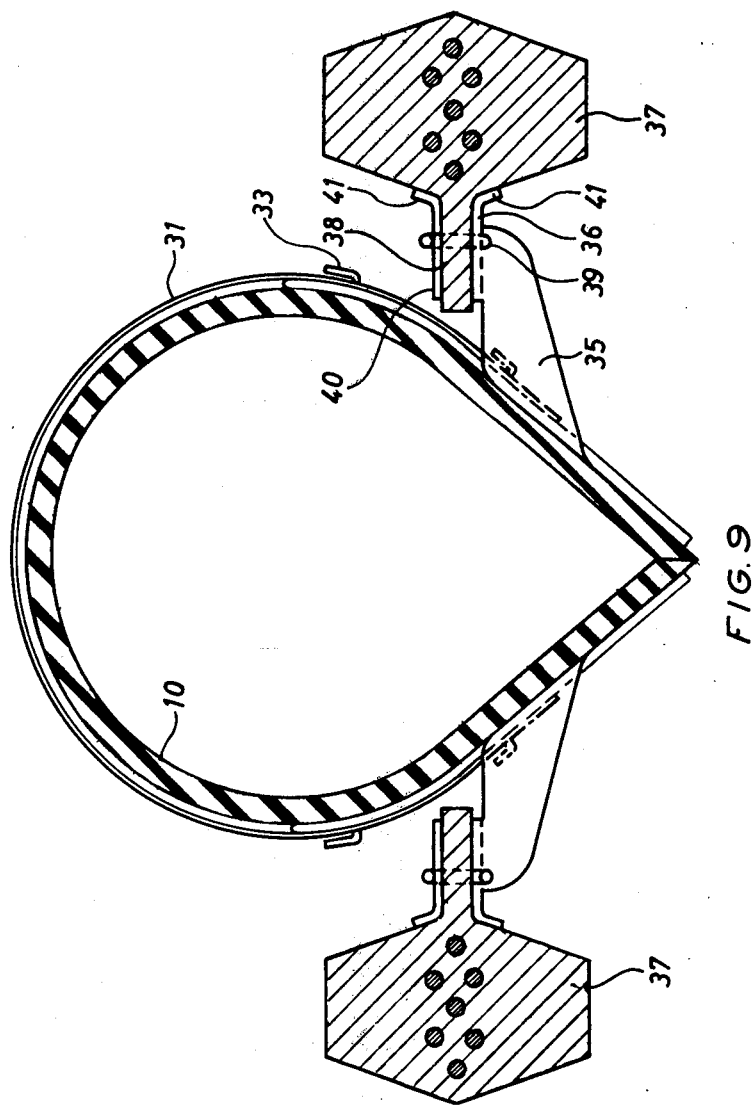
FIG. 9 is a cross section of the tubular belt conveyor in FIG. 7.

In the modification of the tubular belt conveyor according to the invention, which is illustrated in FIGS. 7–9, the conveyor belt 10 is spring-loaded, not by means of an insert in the form of individual steel spring clips or a continuous zig-zag steel wire, but with the aid of a number of yokes 31 of spring band steel disposed on the outer side of the conveyor belt. It goes without saying that in this instance the conveyor belt itself can include a conventional fabric insert like in the earlier described embodiment. The yokes 31 yieldingly urge the conveyor belt into tubular shape with the profile shown in FIG. 9. The yokes have their ends attached to the conveyor belt by means of shoes 32 which are fixed by vulcanization to the conveyor belt. The fixation is realized in that punched-out flaps 33 of the shoes have been bent back and passed through holes 34 in the yokes, whereupon said yokes have been moved into engagement with the flaps and are kept engaged by their spring action, resulting in that the two arms of the yokes are pressed together. Each shoe 32 forms two protruding brackets 35 which are bent so as to confront each other and form a pair of support plates 36. A continuous bead 37 having the shape of a V-belt with cord inserts is formed with a longitudinal central flange 38 and is secured by said flange to the support plates 36 by means of a staple 39 which penetrates the support plates and the flange as well as a washer 40 on the side of the flange opposite to the support plates, said staple being bent into application with said washer. As will appear from FIG. 9, both the support plates 36 and the washer 40 are formed with edge flanges 41 which engage with and support the bead 37, stabilizing it in correct position on the tubular belt conveyor.

Figure 10:
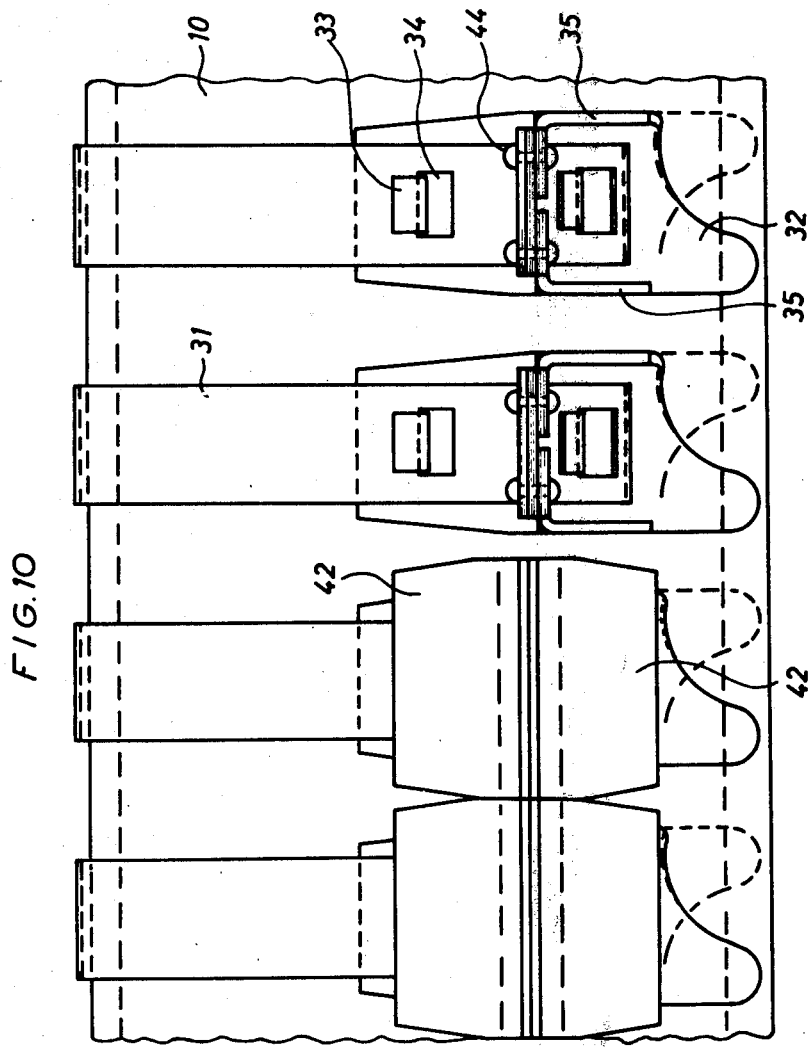
FIG. 10 is a side elevation, partly in longitudinal section, of a further modified embodiment of the tubular belt conveyor according to the invention.
Figure 11:
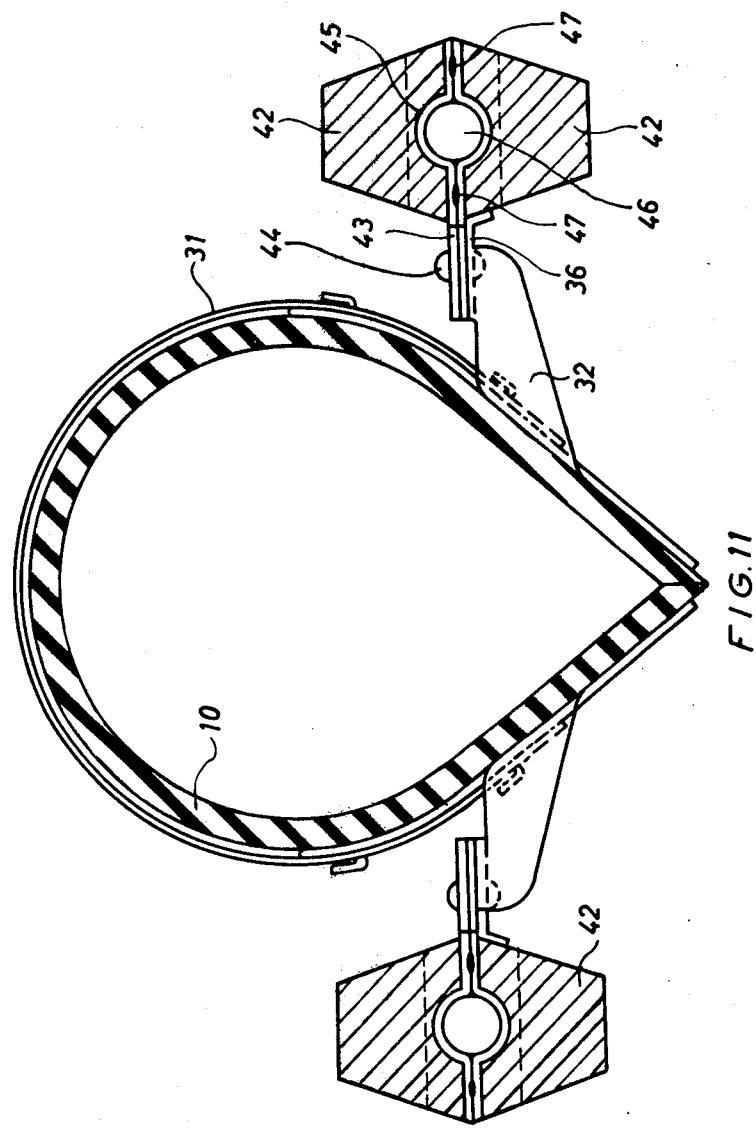
FIG. 11 is a cross section of the tubular belt conveyor shown in FIG. 10.

The embodiment in FIGS. 10 and 11 implies a slight modification of the embodiment just described with reference to FIGS. 7–9. The spring yokes are the same as in FIGS. 7–9, and this also applies to the shoes fixed by vulcanization to the conveyor belt. However, the bead 37 of V-belt shape in this instance is made up of a number of blocks 42 assembled in pairs and secured by vulcanization each to one plate 43 which protrudes from the individual V-belt section formed by two blocks, said blocks 42 and said plates 43 being secured to the support plates 36 by rivets 44. The plates 43 form a semi-circular bight 45, and the V-belt sections disposed in succession along the conveyor belt receive in the circular hole formed by the bights 45 a steel wire 46 which is movable through said hole. The plates 43 are interconnected by spot welding, as indicated at 47, which implies that the blocks have to be secured by welding after the spot welding operation. While the blocks 42 arranged in pairs thus constitute a V-belt along the conveyor belt for engagement with pulleys, the traction arising in the V-belt during operation of the tubular belt conveyor is taken up by the steel wire continuously extending through the blocks. The facing ends of the blocks are bevelled to permit the V-belt to bend easily when the tubular belt conveyor runs over return and guide pulleys so that jamming and clamping is avoided, and for the same purpose the wire is movable through the blocks.

Figure 12:
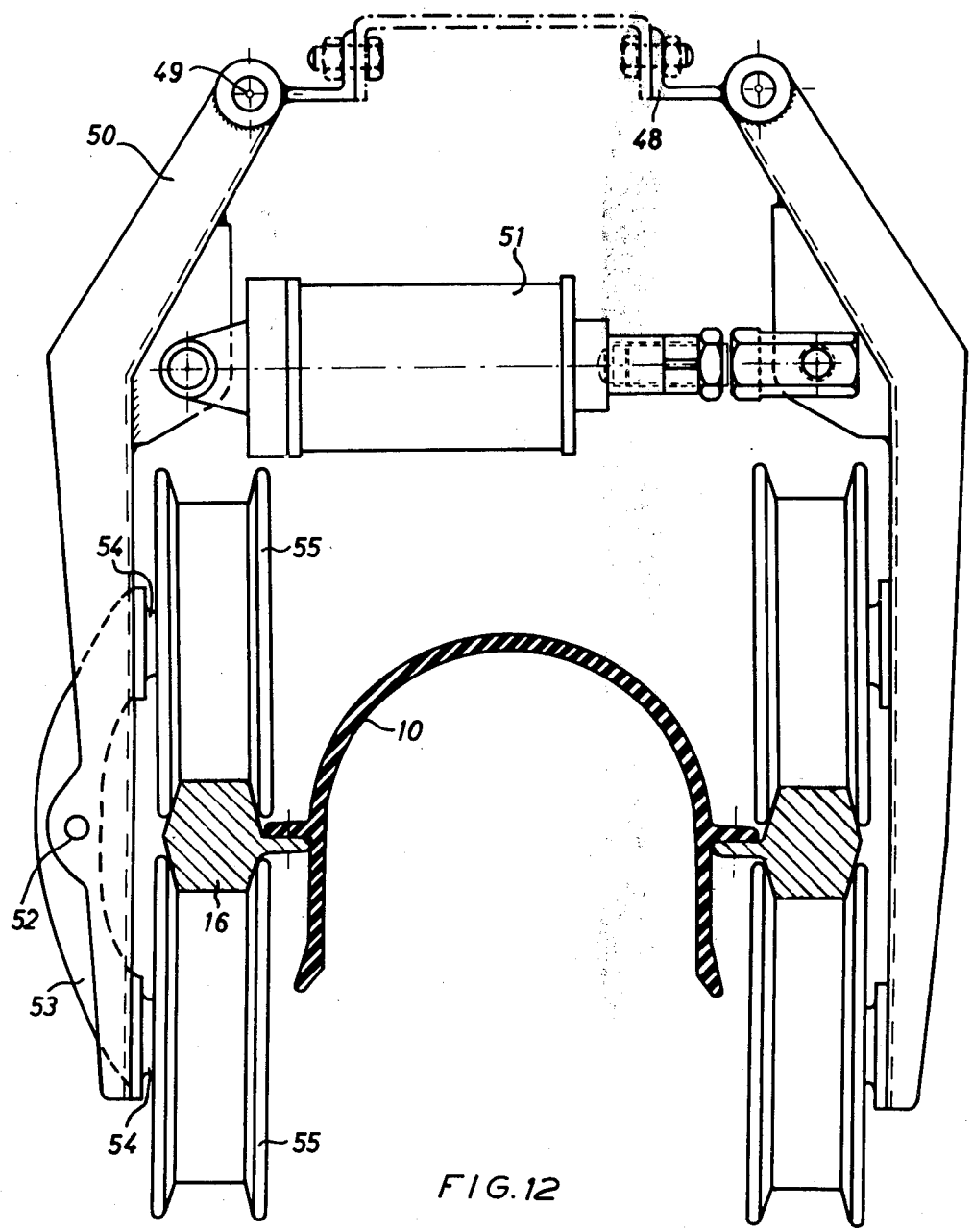
FIG. 12 is a diagrammatic cross section of the tubular belt conveyor in opened position, with an opening mechanism for engagement with the edge bead shown in vertical projection.

FIG. 12 illustrates another way of opening up the tubular belt conveyor than that earlier described with reference to FIGS. 2 and 4. The tubular conveyor belt is pulled apart at the V-belt beads with the use of idler rollers which run in engagement with these beads on opposite sides thereof. In a frame 48 two arms 50 are pivotally suspended at 49. Said arms are movable towards and away from each other by means of a pneumatical piston and cylinder unit which is interposed between the arms. A rocker 53 having two journals 54 is pivotally mounted at 52 on each arm 50. Two pulleys 55 running on opposite sides of the V-belt bead 16 are mounted for rotation on said journals 54. When the conveyor runs in between the pulleys 55 it will be forced into a more or less open position in response to the distance by which the two arms 50 have been moved apart by the piston and cylinder unit 51. Opening mechanisms of the embodiment described can be provided at different points in the path of travel of the conveyor in order that said conveyor may be optionally opened or kept closed by adjustment of the pneumatical piston and cylinder unit 51. Of course, at such points where the tubular profile shall always be kept open the pulleys 55 can be spaced such a relative distance apart that the requisite opening is obtained, in which case several pairs of pulleys 55 may be arranged for gently guiding the conveyor belt from closed to fully opened position and from fully opened position to closed position, respectively. It is also possible to arrange the opening mechanism according to FIG. 12 on a carriage in analogy to that which is apparent from FIG. 6.

What I claim and desire to secure by Letters Patent is:

1. A tubular belt conveyor comprising a plurality of pulleys, an endless conveyor belt running over the pulleys and which is formed to a tubular profile and the longitudinal edges of which converge substantially rectilinearly to one another on the inner run of the endless loop formed by the conveyor belt and are applicable against one another at the longitudinal conveyor belt edges, wherein the conveyor belt is provided with spring clip means to elastically yieldingly load the longitudinal conveyor belt edges into abutting relationship and in which beads having the shape of V-belts are disposed on the sides of the tubular profile to establish engagement of the conveyor belt with the pulleys.

2. A conveyor as claimed in claim 1, wherein a guide is provided for moving the longitudinal edges of the conveyor belt apart against the yielding load exerted by the spring means at some point of the endless loop.

3. A conveyor as claimed in claim 2, wherein the guide includes guide pulleys for providing a convex bight of the conveyor along the inner run of the endless loop, and pressure rollers placed in conjunction with the convex bight and positioned to engage the longitudinal edges of the conveyor belt.

4. A conveyor as claimed in claim 2 wherein the guide comprises some of said pulleys, which are spaced on each side of the belt and in contact with the V-shaped beads of the belt so that the longitudinal edges of the conveyor belt are separated when the conveyor belt passes over said pulleys.

5. A conveyor as claimed in claim 4, wherein the pulleys of said guide are positioned to engage the beads on opposite sides of the belt.

6. A conveyor as claimed in claim 5, wherein the pulleys of said guide are supported by a device for adjusting said pulleys at different distances relative to each other.

7. A tubular belt conveyor comprising a plurality of pulleys, an endless conveyor belt running over the pulleys and formed to a tubular profile, the longitudinal edges of said belt converging substantially rectilinearly to one another on the inner run of the endless loop formed by said belt and being applicable against one another at the longitudinal conveyor belt edges and the sides of said conveyor belt having beads in the form of V-belts to be engaged by said pulleys to drive and guide said conveyor belt, characterized in that said conveyor belt is provided with spring clip means to elastically yieldingly load said longitudinal conveyor belt edges into abutting relationship.

8. A tubular belt conveyor comprising an endless conveyor belt which is formed to a tubular profile and the longitudinal edges of which converge substantially rectilinearly to one another on the inner run of the endless loop formed by the conveyor belt and are applicable against one another at the longitudinal conveyor belt edges, spring clip means associated with the conveyor belt to elastically yieldingly load the longitudinal conveyor belt edges into abutting relationship and in which beads having the shape of V-belts are disposed on the sides of the tubular profile to establish engagement of the conveyor belt with pulleys, and a guide disposed on a unit adjustable into different positions along the conveyor belt, said guide being provided for moving the longitudinal edges of the conveyor belt apart against the yielding load exerted by the spring means at some point of the endless loop.

* * * * *